United States Patent
Senarath et al.

(10) Patent No.: US 11,184,289 B2
(45) Date of Patent: *Nov. 23, 2021

(54) SYSTEMS AND METHODS FOR MANAGING NETWORK TRAFFIC WITH A NETWORK OPERATOR

(71) Applicant: HUAWEI TECHNOLOGIES CO., LTD., Shenzhen (CN)

(72) Inventors: Nimal Gamini Senarath, Ottawa (CA); Hang Zhang, Nepean (CA); Sophie Vrzic, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 214 days.

This patent is subject to a terminal disclaimer.

(21) Appl. No.: 16/448,429

(22) Filed: Jun. 21, 2019

(65) Prior Publication Data

US 2019/0379609 A1 Dec. 12, 2019

Related U.S. Application Data

(63) Continuation of application No. 15/169,376, filed on May 31, 2016, now Pat. No. 10,374,965.

(Continued)

(51) Int. Cl.
*G06F 15/16* (2006.01)
*H04L 12/891* (2013.01)
(Continued)

(52) U.S. Cl.
CPC .......... *H04L 47/41* (2013.01); *H04L 41/0896* (2013.01); *H04L 41/14* (2013.01);
(Continued)

(58) Field of Classification Search
CPC . H04L 47/41; H04L 41/0896; H04L 41/5087; H04L 43/0876; H04L 41/5025;
(Continued)

(56) References Cited

U.S. PATENT DOCUMENTS 5,483,533 A 1/1996 Kuba
9,667,495 B2 * 5/2017 Van Der Merwe ... H04W 92/02
(Continued)

FOREIGN PATENT DOCUMENTS

CA 2813026 A1 4/2012
CN 1875612 A 12/2006
(Continued)

OTHER PUBLICATIONS

International Search Report for International Application No. PCT/CN2016/084397 dated Aug. 23, 2016.
(Continued)

*Primary Examiner* — Hieu T Hoang

(57) ABSTRACT

A method for managing network slice enabled traffic on a communications network is disclosed. The network slice is instantiated on the communications network for providing connectivity resources to a network operator using the communications network. The method comprises measuring a traffic level indicative of the traffic enabled by the network slice; and adjusting the traffic enabled by the network slice in accordance with the traffic level and a network operator enabled function associated with the network slice.

20 Claims, 9 Drawing Sheets

Related U.S. Application Data

(60) Provisional application No. 62/169,084, filed on Jun. 1, 2015, provisional application No. 62/222,545, filed on Sep. 23, 2015.

(51) Int. Cl.
  *H04L 12/24* (2006.01)
  *H04L 12/813* (2013.01)
  *H04L 12/911* (2013.01)
  *H04L 12/26* (2006.01)
  *H04L 29/08* (2006.01)

(52) U.S. Cl.
  CPC ...... *H04L 41/5025* (2013.01); *H04L 41/5087* (2013.01); *H04L 43/0876* (2013.01); *H04L 47/20* (2013.01); *H04L 47/822* (2013.01); *H04L 67/1074* (2013.01)

(58) Field of Classification Search
  CPC ... H04L 67/1074; H04L 47/20; H04L 47/822; H04L 41/14
  See application file for complete search history.

(56) References Cited

U.S. PATENT DOCUMENTS

| | | | |
|---|---|---|---|
| 10,374,965 B2 * | 8/2019 | Senaralh | H04L 43/0876 |
| 2002/0152319 A1 | 10/2002 | Amin et al. | |
| 2010/0144312 A1 | 6/2010 | Runstedler et al. | |
| 2010/0161802 A1 | 6/2010 | Tofighbakhsh et al. | |
| 2010/0318448 A1 | 12/2010 | Li | |
| 2010/0330957 A1 | 12/2010 | Harada et al. | |
| 2011/0125900 A1 | 5/2011 | Janssen et al. | |
| 2011/0276447 A1 | 11/2011 | Paul et al. | |
| 2011/0306305 A1 | 12/2011 | Huang | |
| 2011/0314145 A1 | 12/2011 | Raleigh et al. | |
| 2012/0151009 A1 | 6/2012 | Bouazizi et al. | |
| 2012/0155264 A1 * | 6/2012 | Sharma | H04L 43/0852 370/232 |
| 2012/0233302 A1 * | 9/2012 | Kallin | H04L 41/5025 709/221 |
| 2013/0303114 A1 * | 11/2013 | Ahmad | H04M 15/49 455/406 |
| 2014/0016464 A1 | 1/2014 | Shirazipour et al. | |
| 2014/0086052 A1 | 3/2014 | Cai et al. | |
| 2014/0212135 A1 * | 7/2014 | Ji | H04Q 11/0005 398/51 |
| 2014/0219088 A1 | 8/2014 | Oyman | |
| 2014/0258511 A1 | 9/2014 | Sima et al. | |
| 2014/0269295 A1 | 9/2014 | Anumala | |
| 2014/0362700 A1 | 12/2014 | Zhang | |
| 2015/0063112 A1 * | 3/2015 | Wu | H04L 45/64 370/235 |
| 2015/0230184 A1 | 8/2015 | Raleigh et al. | |
| 2015/0365288 A1 * | 12/2015 | Van Der Merwe | G06Q 10/06 370/254 |
| 2016/0156513 A1 | 6/2016 | Zhang et al. | |
| 2016/0352645 A1 | 12/2016 | Senarath et al. | |
| 2016/0352924 A1 | 12/2016 | Senarath et al. | |
| 2017/0126492 A1 * | 5/2017 | Law | H04L 12/6418 |
| 2017/0142010 A1 * | 5/2017 | Mathew | H04L 12/6418 |
| 2017/0302587 A1 * | 10/2017 | Houyou | H04L 67/322 |
| 2017/0310478 A1 * | 10/2017 | Karame | G06F 21/6227 |
| 2017/0324536 A1 | 11/2017 | Zarif et al. | |
| 2017/0374696 A1 * | 12/2017 | Doll | H04L 69/22 |
| 2019/0312915 A1 | 10/2019 | LaJoie et al. | |

FOREIGN PATENT DOCUMENTS

| | | |
|---|---|---|
| CN | 101340376 A | 1/2009 |
| CN | 101374055 A | 2/2009 |
| CN | 101562570 A | 10/2009 |
| CN | 101998348 A | 3/2011 |
| CN | 102318266 A | 1/2012 |
| CN | 102523291 A | 6/2012 |
| CN | 102812450 A | 12/2012 |
| CN | 103038652 A | 4/2013 |
| CN | 103250401 A | 8/2013 |
| CN | 103731887 A | 4/2014 |
| CN | 103905523 A | 7/2014 |
| CN | 103959798 A | 7/2014 |
| CN | 104145449 A | 11/2014 |
| CN | 104641601 A | 5/2015 |
| EP | 1784027 A1 | 5/2007 |
| EP | 2325708 A3 | 1/2012 |
| EP | 2627034 A1 | 8/2013 |
| EP | 2577332 B1 | 9/2016 |
| GB | 2311439 A | 9/1999 |
| JP | 2011015021 A | 1/2011 |
| JP | 2016521099 A | 7/2016 |
| WO | 2012162646 A1 | 11/2012 |
| WO | 20130159794 A1 | 10/2013 |
| WO | 2014052044 A2 | 4/2014 |
| WO | 2014194188 A1 | 12/2014 |
| WO | 2014197716 A1 | 12/2014 |

OTHER PUBLICATIONS

International Search Report for International Application No. PCT/CN2016/084406 dated Aug. 29, 2016.
International Search Report for International Application No. PCT/CN2016/084410 dated Aug. 23, 2016.
3GPP TR 22.891 titled Study on New Services and Market Technology Enablers, Sep. 2016.
ETSI GS NFV 001 titled "Network Function Virtualization (NFV); Use Cases", Oct. 2013.
ETSI GS NFV 002 titled "Network Function Virtualization (NFV); Architectural Framework", Oct. 2013.
"NGMN 5G White Paper," by the Next Generation Mobile Network Alliance, Feb. 17, 2015.
Extended European Search Report dated Apr. 12, 2018 for corresponding European Application No. 16802557.5 filed Jun. 1, 2016.
Shrivastava et al. "An SDN-Based Framework for Elastic Resource Sharing in Integrated FDD/TDD LTE-A HetNets", Oct. 8, 2014.
Extended European Search Report dated Apr. 17, 2018 for corresponding European Application No. 16802566.6 filed Jun. 1, 2016.
Extended European Search Report dated Apr. 26, 2018 for corresponding European Application No. 16802563.3 filed Jun. 1, 2016.
Shisong, "Research of Service Evaluation Methods Based on Dynamic Service Resource Distribution Network", Beijing University of Posts and Telecommunications, Dec. 31, 2012, with an English abstract, total 67 pages.

* cited by examiner

SYSTEMS AND METHODS FOR MANAGING NETWORK TRAFFIC WITH A NETWORK OPERATOR

CROSS-REFERENCE TO RELATED APPLICATIONS

This application is a continuation of U.S. patent application Ser. No. 15/169,376, filed May 31, 2016, which claims the benefit and priority from U.S. Provisional Application Ser. No. 62/169,084 titled "Method and Apparatus for Customer Service Management for a Wireless Communication Network" filed on Jun. 1, 2015, and U.S. Provisional Application Ser. No. 62/222,565 titled "Method and Apparatus for Customer Service Management for a Wireless Communication Network" filed on Sep. 23, 2015, which are incorporated by reference herein in their entirety.

FIELD OF THE INVENTION

The present invention pertains to the field of network communications, and in particular towards systems and methods for managing network traffic with a network operator.

BACKGROUND

As Mobile Communication Networks have become more heavily relied upon, traffic profiles associated with different usage scenarios and different device types have arisen. Some types of devices only connect sporadically, and generate a small amount of traffic. However some networks have a large number of such devices deployed. This results in a large number of small messages being exchanged. The reliability of the connection for such devices may not need to be very high. Other devices may connect with a need for higher bandwidth connections, while others may require ultra-reliable connections. Serving these various connection requirements is difficult using a single network with a defined architecture as it would require the entire network to support the most strenuous use cases for each connection.

Communication networks can also make use of technologies such as Network Function Virtualization (NFV), Software Defined Networking (SDN) in order to differentially serve the demands from mobile devices, such as User Equipment (UEs) connected to the network. In building advanced networks, such as those to support future developments in wireless networks (including next generation wireless networks, such as a Fifth Generation (5G) network), a common pool of network resources can be partitioned using network slicing techniques to provide an operator with the ability to create isolated virtual networks over which different traffic flows, each with different requirements, can travel.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method apparatus for managing network traffic on a communications network through a network operator.

In accordance with embodiments of the present invention, there is provided a method for managing network slice enabled traffic on a communications network. The network slice is instantiated on the communications network for providing connectivity resources to a network operator using the communications network. In order to provide connectivity resources, a traffic level measurement indicative of the traffic carried within the network slice is received. After this measurement has been received, an instruction is transmitted to a network operator accessible function associated with the network slice to modify traffic management parameters. This modification is to adjust a traffic profile within the slice in accordance with a determination that the received traffic level measurement is indicative of an unwanted traffic profile.

In accordance with embodiments of the present invention, there is provided a method for managing network slice enabled traffic on a communications network, in which modified traffic management parameters may be received from a network operator accessible function. Traffic levels may be measured through a traffic monitoring function associated with the network slice. When transmitting an instruction to the network operator a modified traffic management parameter may also be transmitted. The modified traffic parameter is transmitted to reduce traffic carried in the slice in response to a comparison of the received traffic level measurement to a threshold.

In accordance with embodiments of the present invention, there is provided a method for managing network slice enabled traffic on a communications network, wherein the traffic carried within the network slice comprises a plurality of flows. When performing the step of transmitting an instruction, such an instruction includes transmitting modified traffic management parameters to prioritize at least one of the plurality of flows. The step of transmitting an instruction may also comprise transmitting an instruction to block at least one of the plurality of flows.

In accordance with embodiments of the present invention, there is provided a method for managing network slice enabled traffic on a communications network, wherein the traffic carried within the network slice is generated by at least one user equipment communicatively coupled to the communications network. When transmitting an instruction to the network operator, the instruction may include an instruction to the at least one user equipment. The instruction to the user equipment may be to reduce the traffic carried within the network slice, to move into another geographical area not served by the network slice, or to access the communications network during another time.

In accordance with embodiments of the present invention, there is provided a method for managing network slice enabled traffic on a communications network, in which received traffic level measurements are compared to a resource allocation threshold. When transmitting an instruction to the network operator, an instruction may be transmitted to the network operator accessible function to acquire additional connectivity resources for the network slice from the communications network. This is useful when available resources are below a threshold as indicated through a comparison between the traffic level measurement and the resource allocation threshold. The resource allocation threshold may comprise a proportion of connectivity resources of the communications network allocated to a network slice.

In accordance with embodiments of the present invention, there is provided network controller for managing traffic on a communications network corresponding to user equipment associated with a network operator. The network controller includes a processor; an input interface, an output interface and a non-transient memory. The input interface is configured for receiving a traffic level from the communications network and parameters from the network operator. The traffic level indicates the traffic corresponding to the user equipment. The parameters are used for adjusting the traffic on the communications network in accordance with the traffic level. The output interface transmits messages to a network functions. The non-transient memory stores instructions that, when executed by the processor, cause the network controller to transmit, over the output interface, an instruction to a network operator accessible function. The instruction is an instruction to modify traffic management parameters to adjust a traffic profile within the slice in accordance with a determination that the received traffic level measurement is indicative of an unwanted traffic profile.

In accordance with embodiments of the present invention, there is provided network controller for managing traffic on a communications network corresponding to user equipment associated with a network operator, wherein the instructions stored in memory may further comprise instructions to cause the network controller to compare the traffic level to a threshold. When the traffic level meets a certain threshold, the instructions may transmit an instruction over the output interface to the user equipment to reduce the generated traffic.

In accordance with embodiments of the present invention, there is provided a method for managing network slice enabled traffic on a communications network. The network slice, which is instantiated on the communications network, may be for providing connectivity resources to a network operator using the communications network. This is achieved by receiving a traffic level indicative of the traffic enabled by the network slice. Once the traffic level has been received, the network slice may be instructed to adjust the traffic according to the traffic level.

In accordance with embodiments of the present invention, there is provided a method for managing traffic enabled by a network slice on a communications network. This may be accomplished be providing parameters to a network operator accessible function associated with the network slice. The parameters may be for instructing the network operator accessible function to manage traffic in accordance with a traffic level indicative of the traffic enabled by the network slice.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
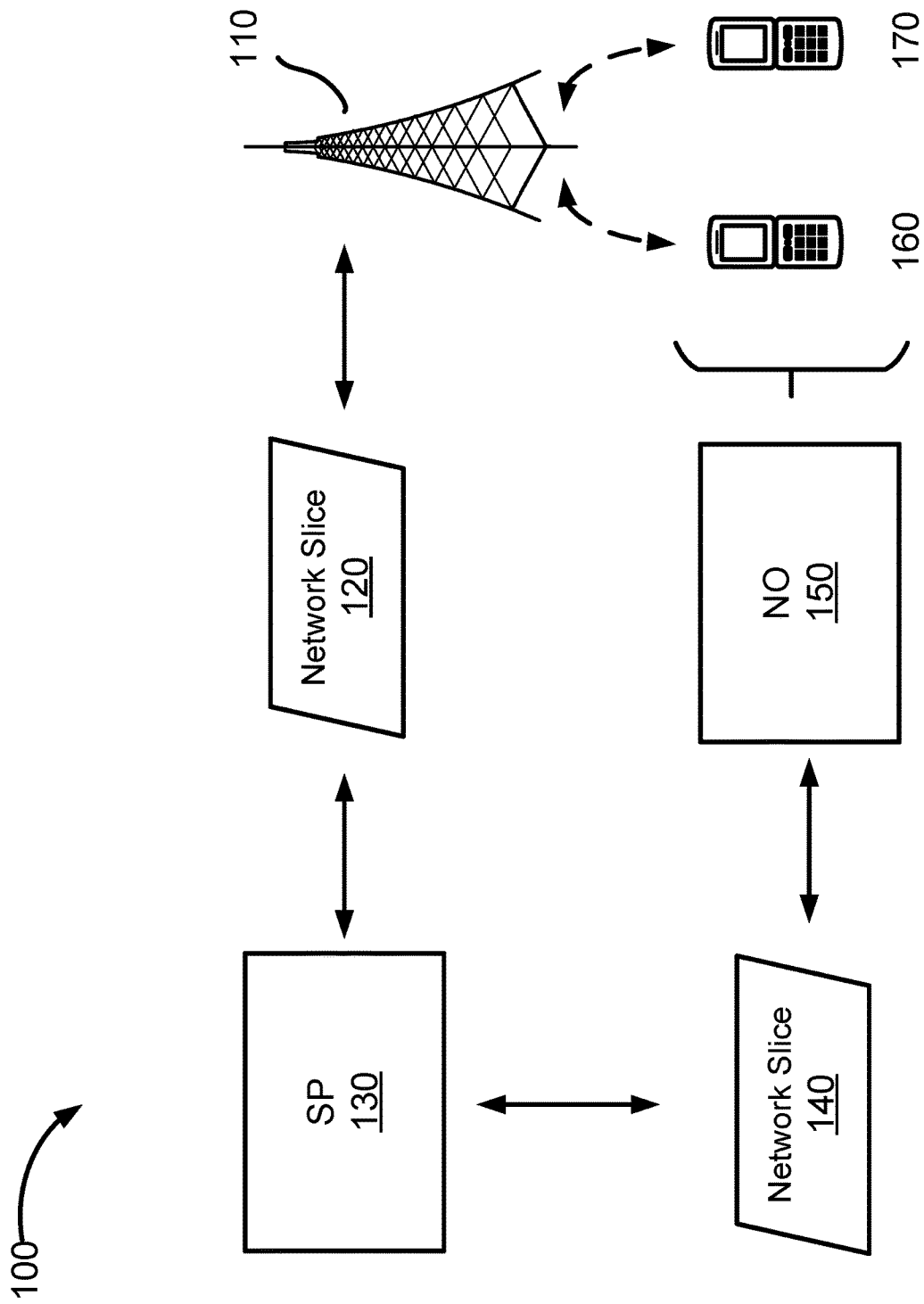
FIG. 1 illustrates a functional network architecture, according to an embodiment of the present invention.

Communication networks (hereinafter "Networks") may have Network Slices (hereinafter "Slices") deployed thereon creating virtual network architectures operating on the underlying physical Network infrastructure. A Slice is a collection of functions that are logically connected in order to perform a service over the Network (for example, managing a set of flows that transmit data across Network nodes) that may be associated with a network request (for example, by a UE wirelessly connected to the Network). Accordingly, Network Slices can provide greater flexibility in creating functional network architectures for managing and carrying out large numbers of competing service demands. Further information on Slices and NFVs associated with communication networks may be found in communication standards literature such as: 3GPP TR 22.891 titled "Study on New Services and Market Technology Enablers", ETSI GS NFV 001 titled "Network Function Virtualization (NFV); Use Cases", and ETSI GS NFV 002 titled "Network Function Virtualization (NFV); Architectural Framework", all of which are fully incorporated herein by reference.

The traffic flows managed by different Network Slices are typically isolated from flows in other slices. To this effect, each Slice is usually allocated a separate portion of the Network's connectivity resources (e.g. bandwidth of the physical links between Network nodes) and/or processing resources (e.g. use of the processors or controllers at Network nodes) for independently carrying out their services. This allows each Slice to meet certain performance guarantees (e.g. Quality of Service (QoS) or Quality of Experience (QoE)) for the services they support, without affecting the performance of another Slice. Slice isolation further ensures that the traffic managed by each Slice remains "unseen" and unknown to other Slices.

Network Slices are also used as mechanisms for allocating access and control of connectivity resources (e.g. use and control of physical links) of the underlying physical network infrastructure. For example, a physical network infrastructure owner may allocate a portion of the connectivity resources to a primary entity (for example, a connectivity service provider) who may access and control its allotment of connectivity resources on behalf of the physical Network Infrastructure owner. The primary entity may then further redistribute access of its allotment of connectivity resources to other secondary entities (for example, Network Operators) who wish to serve its own end-users connected to the physical Network infrastructure, while retaining control over the connectivity resources. Accordingly, while a secondary entity may acquire access to a Network infrastructure to serve the needs of its associated end-users, this, this model of connectivity resource distribution does not provide secondary entities with any control over the traffic generated on the physical Network infrastructure by its end-users. Moreover, because access to connectivity resources are typically governed by Service Level Agreements (SLAs) which sets out various particulars and fees between the parties involved, secondary entities are unable to use and/or leverage their connectivity resources in a manner that would be more technically and economically efficient.

Referring to FIG. 1, there is shown a functional network architecture 100, according to an embodiment of the present invention. The network architecture 100 includes a physical Network infrastructure 110 (or communications network) having its resources (e.g. use of physical links, bandwidth across links, channels, frequencies, resource blocks, etc.) partitioned using a plurality of Slices 120, 140. Service Provider (SP) 130 is an entity logically connected to Slice 120 and Slice 140, while a Network Operator (NO) 150 is an entity logically connected to Slice 140. NO 150 has associated therewith UEs 160, 170, which can connect to the physical Network infrastructure 110 (for example, via wireless radio link). As will be explained in further detail below, the functional network architecture 100 provides a means for NO 150 to manage network traffic (e.g. bandwidth or flow of data) generated by UEs 160, 170 across the physical Network infrastructure 110 through Slice 140.

Physical Network infrastructure 110 includes at least one Access Point (AP) sufficient to establish the necessary physical links (e.g. via radio communications or wireless interface) to carry out transmissions (e.g. traffic) involving UEs 160 and 170 to other network nodes, or other UEs coupled thereto (not shown). While FIG. 1 depicts physical Network infrastructure 110 comprising a single AP, in other embodiments (not shown), physical Network infrastructure 110 may comprise any number and combination of nodes, APs, routers, base stations, nodeBs, evolved-nodeBs, and the like.

In FIG. 1, SP 130 can be an intermediate entity which borrows or acquires resources (e.g. use of physicals links and/or computing resources) of the physical Network infrastructure 110, and further redistributes its acquired connectivity resources to various network operators (via additional network slices, as will be discussed below). SP 130 may also directly manage resources of the physical Network infrastructure 110. It should be understood that PNI 110 may provide Radio Access Network services, while SP 130 makes use of the resources of PNI 110 and adds Core Network functionality so that a Network Operator can build a mobile network atop the resources of the two entities. For example, SP 130 may manage the physical links of Network infrastructure 110 in order to enable traffic (i.e. the flow of data) involving UEs 160 and 170, in certain situations. SP 130 is obtains a portion of the physical Network infrastructure 100's resources (e.g. time and frequency resources) and/or computing usage resources. By being provided both isolation and at least partial control of Network infrastructure 110's resources, SP 130 is able to define the obtained resources as a Slice 120. The operational requirements of the resources underlying Slice 120 are typically defined by a Service Level Agreement (SLA) between SP 130 and the owner of physical Network infrastructure 110.

NO 150 is a network operator which obtains resources (e.g. connectivity, compute and communications resources) of the physical Network infrastructure 110 from SP 130. Typically, NO 150 obtains a portion (i.e. a 'slice') of the resources allocated to SP 130 and defined in Slice 120. From the perspective of NO 150, SP 130 has a set of resources (allocated via slice 120) and creates Slice 140 specifically for NO 150 to have a degree of control and isolation from other NO's (not shown). NO 150 does not directly interact or identify the physical resources (belonging to the owner of physical Network infrastructure 110) as it obtains its access from SP 130 via Slice 140. The resources allocated to NO 150 (via Slice 140) allow it to serve the requests of its associated UEs 160 and 170 through the physical Network infrastructure 110. UEs 160, 170 may want to attach to NO 150 through the resources of physical Network infrastructure 110. Accordingly, NO 150 obtains resources defined in Slice 140 from SP 130, whose resources it turn are obtained/defined from Slice 120. The resources allocated to NO 150 through Slice 140 may also be provisioned in accordance with an SLA between SP 130 and NO 150.

While SP 130 and NO 150 are depicted in FIG. 1 as distinct entities physically separate from the physical Network infrastructure 110, in certain embodiments, they may also comprise functional entities deployed within the physical Network infrastructure 110, or a combination thereof (not shown).

Figure 2:
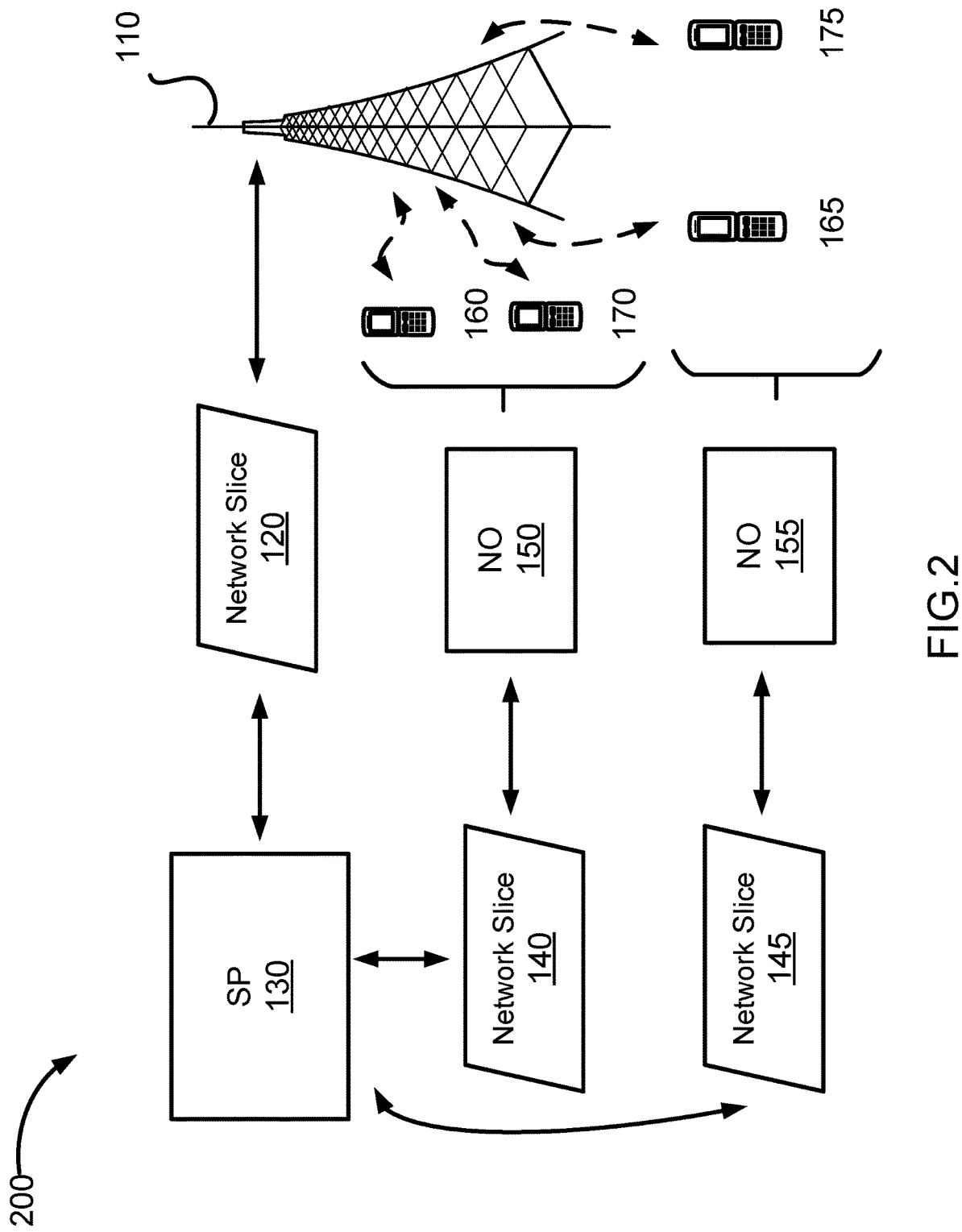
FIG. 2 illustrates another functional network architecture, according to an embodiment of the present invention.

Referring to FIG. 2, there is shown another functional network architecture 200, according to an embodiment of the present invention. Network architecture 200 of FIG. 2 is similar to the architecture 100 shown in FIG. 1, however, Network Architecture 200 differs in that a second NO 155 is provided with network services (on physical Network infrastructure 110) through SP 130. The network services provided by SP 130 are provided via Slice 145 which allows traffic from NO 150 to be isolated from traffic from NO 155. Through Slice 145, NO 155 is able to serve the requests of UEs 165, 175 communicatively coupled to physical Network infrastructure 110 and associated with NO 155.

Figure 3:
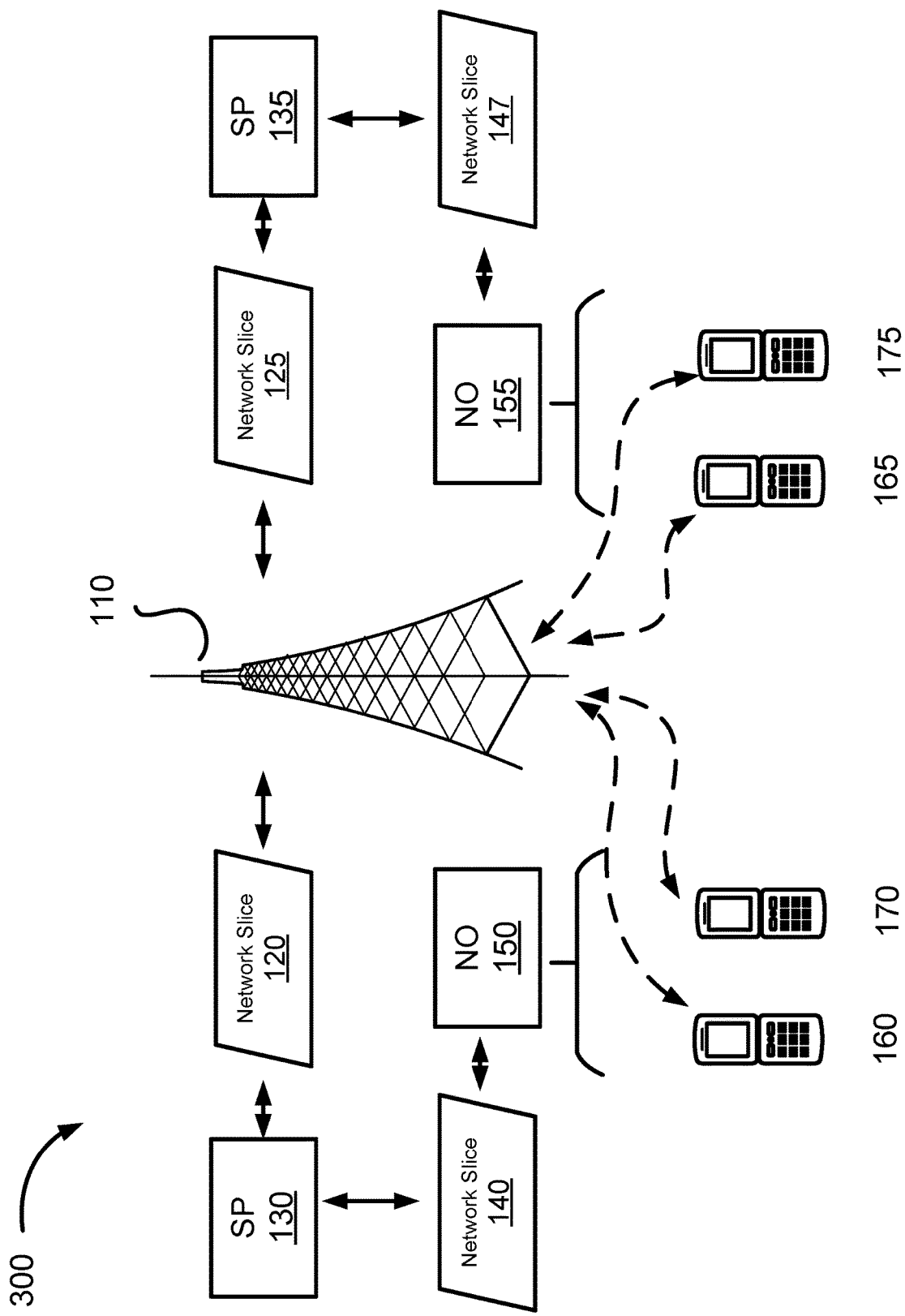
FIG. 3 illustrates another functional network architecture, according to an embodiment of the present invention.

Referring to FIG. 3, there is shown yet another functional network architecture 300, according to an embodiment of the present invention. Functional network architecture 300 of FIG. 3 is similar to the architecture 200 shown in FIG. 2 however, Network Architecture 300 differs in that in addition to SP 130, another SP 135 acquires connectivity resources from the physical Network infrastructure 110. Where SP 130 obtains its share of the resources of the physical network infrastructure 110 from Slice 120, SP 135 makes use a separate Slice 125. Through the use of different Slices 120, 125, the two SPs 130, 135 are isolated from each other and may not even be aware of the other's existence. SP 135 provides services, including connectivity services based on the resources of physical network infrastructure 110, to NO 155 via Slice 147. NO 155 accordingly uses the resources of slice 147 to serve associated UEs 165, 175.

Figure 4:
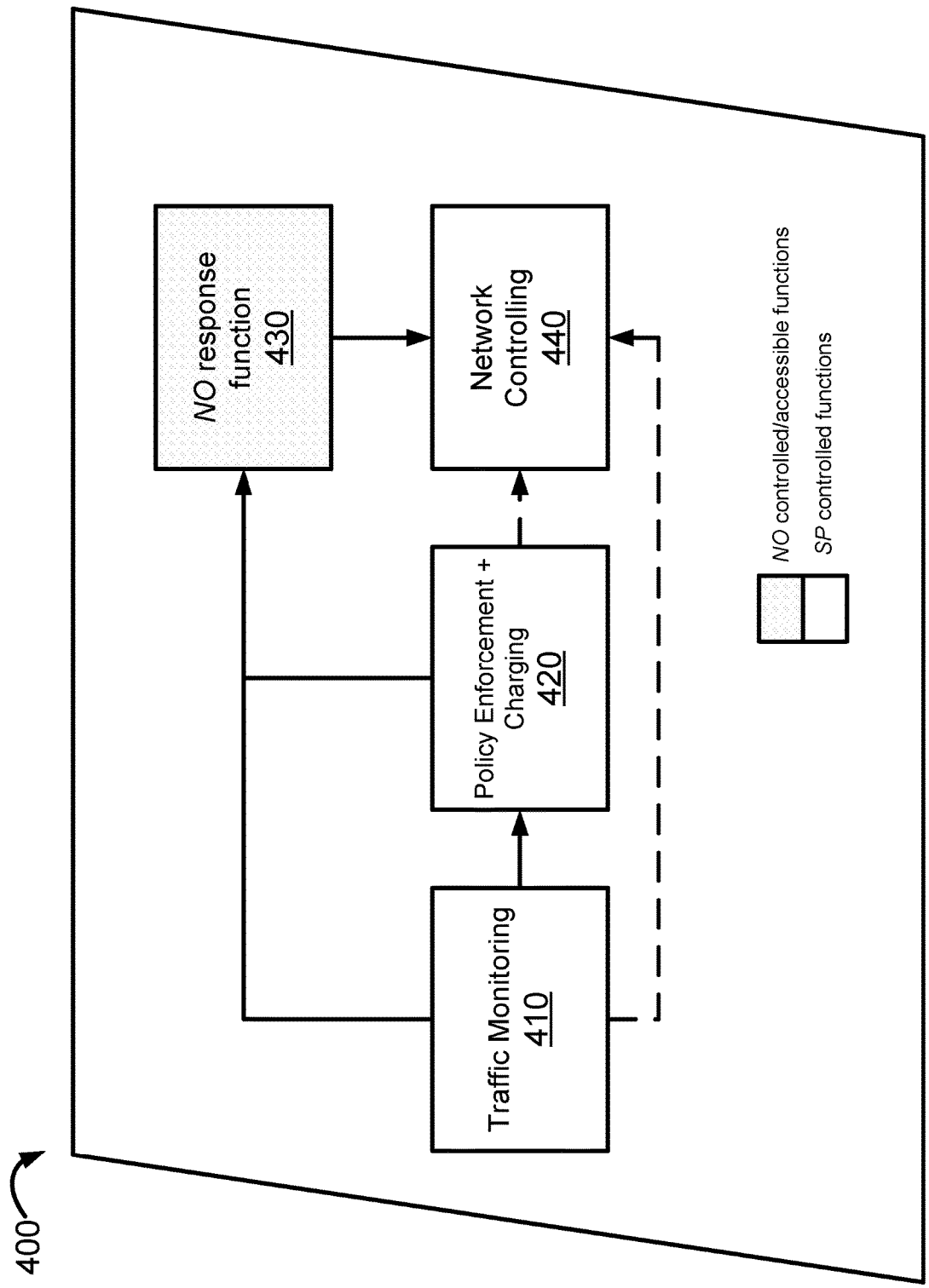
FIG. 4 illustrates a functional representation of a Network Slice, according to an embodiment of the present invention.

Referring to FIG. 4, there is shown a functional representation of a Slice 400 as would be provided to an NO by an SP for example. Slice 400 may comprise any one of Slices 140, 145, and 147, in FIGS. 1-3, in certain embodiments. Slice 400, for example, may be provided or instantiated by SP 130 using its resources, which may include a share of the resources of physical Network infrastructure 110. As shown, Slice 400 includes a Traffic Monitoring function 410, a Policy Enforcement and Charging (PEC) function 420, a Network Operator (NO) response function 430, and a Network controlling function 440 associated therewith. The Traffic Monitoring function 410 is a function that monitors a traffic level (e.g. net bandwidth used) indicative of the traffic (e.g. uplink and downlink data flows along with inter-function traffic) carried within Slice 400. The Policy Enforcement and Charging function 420 is a function that may provide a default policy for handing traffic within the slice, and for determining the charges incurred by a NO in view of the traffic associated with Slice 400. The traffic associated with slice 400 will typically be considered to include the traffic generated by devices associated with the NO (for example, UEs 160, 170) and traffic that is transmitted to the devices, along with the overhead associated with managing the connectivity of the devices. The resources allocated to NO, and the charges incurred, may be set in accordance with a SLA, or other agreement, between an SP and NO. Should the resources used by the NO exceed that stipulated in the SLA, the Policy Enforcement and Charging function 420 may enforce the resource over-usage by throttling or stopping excess usage, or by levying excess usage charges to the NO. For example, the Policy Enforcement and Charging function 420 may enforce traffic policing at specific ingress points associated with physical network infrastructure for services managed by Slice 400. The NO response function 430 is an NO accessible and controllable function which allows the NO to determine the resource usage/consumption of traffic generated by its associated devices via Slice 400. For example, if the traffic generated by NO's devices via Slice 400 approaches the limit for that allocated to NO under an SLA, then the NO may choose to reduce its traffic to avoid any excess usage fees. This may be done by NO prioritizing certain traffic flows generated by its devices (for example, in view of QoS for each service), and deferring lower priority flows (via instructions sent by NO response function 430) in order to prevent traffic from exceeding allocated resource limits. In some cases, NO may (via NO response function 430) proceed with excess resource usage (subject to a SLA) in order to meet the QoS requirements for certain services/flows. The Network Controlling function 440, is a function that is coupled to the logical infrastructure and functions provided to the NO by the SP within slice 400. In some embodiments, the Network Controlling function 440 can send instructions that control the usage of physical Network infrastructure 110. This may be done to allow the activation or control of the physical links necessary to carry out the decisions made in accordance with the NO response function 430 and the Policy Enforcement and Charging function 420. For example, The Network Controlling function 440 may include both traffic engineering and link scheduling functions, as understood by those skilled in the art.

As described above, the NO response function 430 is a NO accessible and/or controllable function which allows the NO to specify how to provision traffic associated with devices operating via Slice 400. For example, an NO may provide conditions, thresholds, and parameters to the NO response function 430 for making a traffic management decision in view of traffic associated with NO's devices. Traffic shaping decisions made by the NO response function 430, can then be logically relayed to the network controlling function 440 in order to carry out its decision. Through the NO response function 430, the NO can make decisions such as: prioritizing certain data flows (for example, related to services having varying degrees of QoE), capping or limiting bandwidth usage of certain data flows, prioritizing packets from certain flows, or even blocking certain flows. The NO may make these decisions in view of information provided by the traffic monitoring function 410 and/or Policy Enforcement and Charging function 420, or independently without this information. In certain embodiments, the NO response function 430 may also communicate to specific UEs responsible for data flows the UE wishes to manage or control, in order to shape the traffic behaviour of their respective flows. For example, NO response function 430 may request that certain UEs reduce their traffic consumption, reduce the amount of traffic generated by an application by modifying a priority index associated with the application or with flows generated by the application, cancel or prevent a request for certain bandwidth intensive data, ask the UE to move to another geographical area (for example, a less traffic congested area), or request the UE access its desired data at a later or specific time (for example, to pool network usage into different times). The NO response function 430 may also request that the NO increase or decrease its allotted resources under an SLA, in order to more efficiently meet all of the service requests managed by Slice 400.

Figure 5:
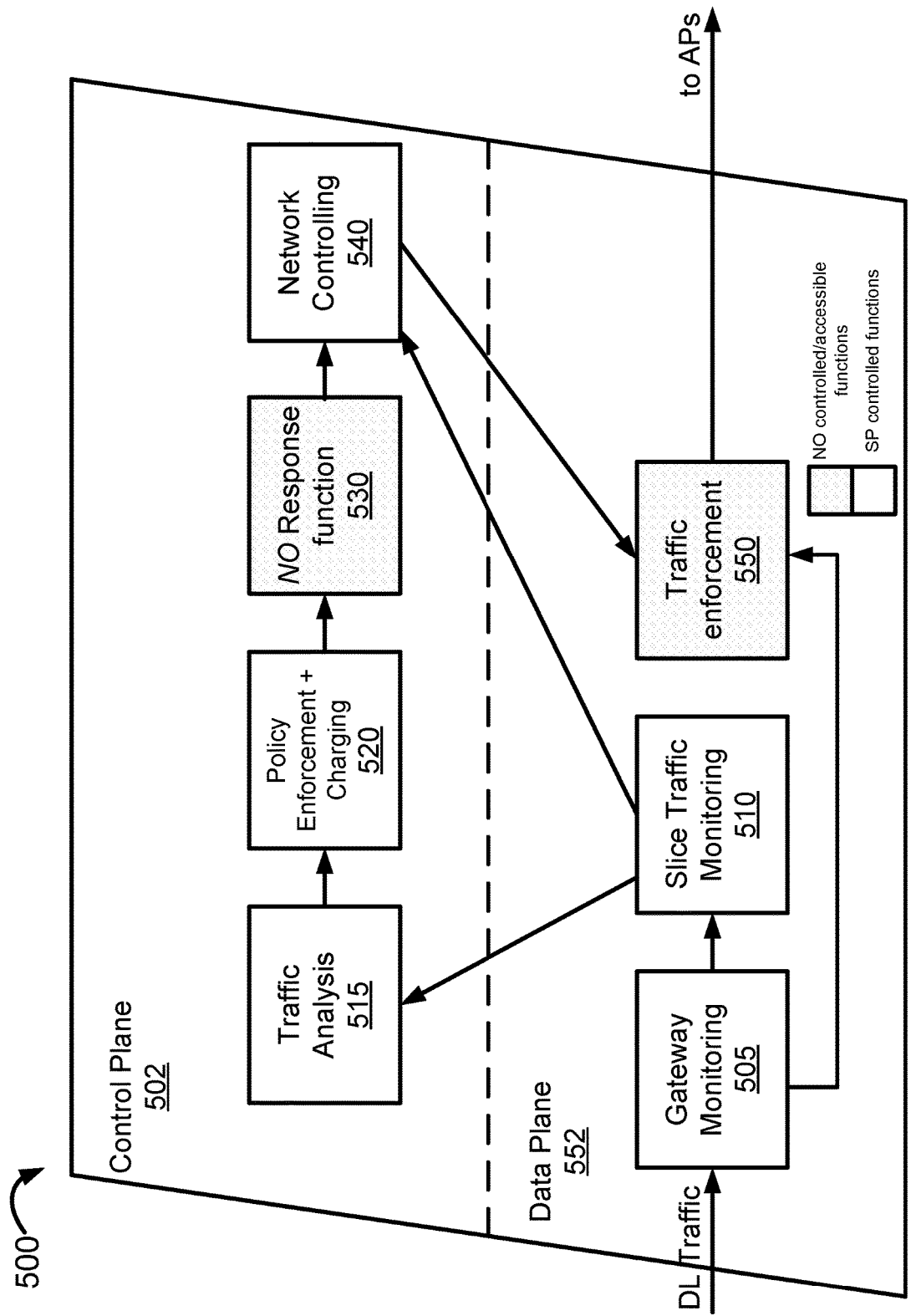
FIG. 5 illustrates another functional representation of a Network Slice, according to an embodiment of the present invention.

Referring to FIG. 5, there is shown a functional representation of a Slice 500 used to manage DownLink (DL) traffic, and may also comprise any one of Slices 140, 145, and 147, in FIGS. 1-3, in certain embodiments. Slice 500 is similar to that of Slice 400 in FIG.4, except in that its functions are divided into a Control Plane 502 and a Data Plane 552 (which may also be referred to as a user plane), in adherence to various telecommunications transmission protocols. As understood by those skilled in the art, the Control Plane 502 generally comprises management level functions that determine traffic routing decisions, protocol configuration, and traffic management. The interaction between these functions may be referred to as Control Plane signalling. The Data Plane 552 generally comprises functions that relate to data forwarding, tagging, queuing, and other data-specific functions. The Data Plane 552 is used to route data associated with user traffic flows. It should be understood that the data and control planes are logical constructs used to help separate the role of different functions and entities. Control plane traffic typically carries messages that instruct the entities that perform user plane routing. Implementation of the Control Plane 502 and Data plane 552 also provides a measure of security in segregating certain functions of Slice 500 between an NO and SP, for example.

In addition to the corresponding functions described above for Slice 400, Slice 500 further comprises a Gateway Monitoring function 505, a Traffic Analysis function 515, and a Traffic Enforcement function 550, logically interconnected with other functions as shown in FIG. 5. The Gateway monitoring function 505 is a function that monitors DL traffic associated with Slice 500 at a specific gateway node within physical Network infrastructure 100. For example, Gateway monitoring function 505 may monitor a radio edge node associated with a specific UE to determine the traffic it is generating or receiving. Traffic Analysis function 515 collects data associated with user plane traffic. This collected data allows the Traffic Analysis function 515 to provide information that can be used by control plane functions to shape and route data plane traffic flows. The Traffic enforcement function 550 is a function that acts upon instructions from the network controlling function 540 to enforce access and traffic generation policies. This allows for traffic shaping policies to be enforced, and allows the NO to shape the generated traffic in accordance with the policies set by the PEC 520 and other control plane functions.

The NO response function 530 in Slice 500 is similar to the NO response function 430 in Slice 400, in that it allows the NO to determine policies that govern the resource usage/consumption of traffic generated by its associated devices via Slice 500. These determined policies can then be provided to the Network Controlling function 540 which can create rules based on the policies of the NO response function 530. These rules can be sent to Traffic Enforcement 550. In one example, based on information gathered by slice traffic monitoring function 510, traffic analysis function 515 can determine an increase in downlink traffic associated with a particular deployment of devices. The PEC 520 and NO response function 530 can determine that simply allowing the immediate distribution of this downlink traffic will result in the traffic in the slice exceeding the agreed upon levels. The NO response function 530 can examine the SLA associated with the customer that this flow is associated with. If the SLA allows for deferred delivery of traffic, the NO response function 530 can instruct the Network controlling function 540 that the increased traffic flow can be delayed by buffering the traffic, either in the network or at the APs. The Network controlling function 540 can then provide a set of rules to be applied by traffic enforcement function 550. Traffic Enforcement function 550 can direct the traffic flows in question into a buffer, or could reject the flows by instructing their source that traffic is not being accepted until later. In this manner, the functions can cooperate to allow for the SLA between the NO and SP to be respected while not exceeding the traffic allocation for slice 500 at a given time of day.

Figure 6:
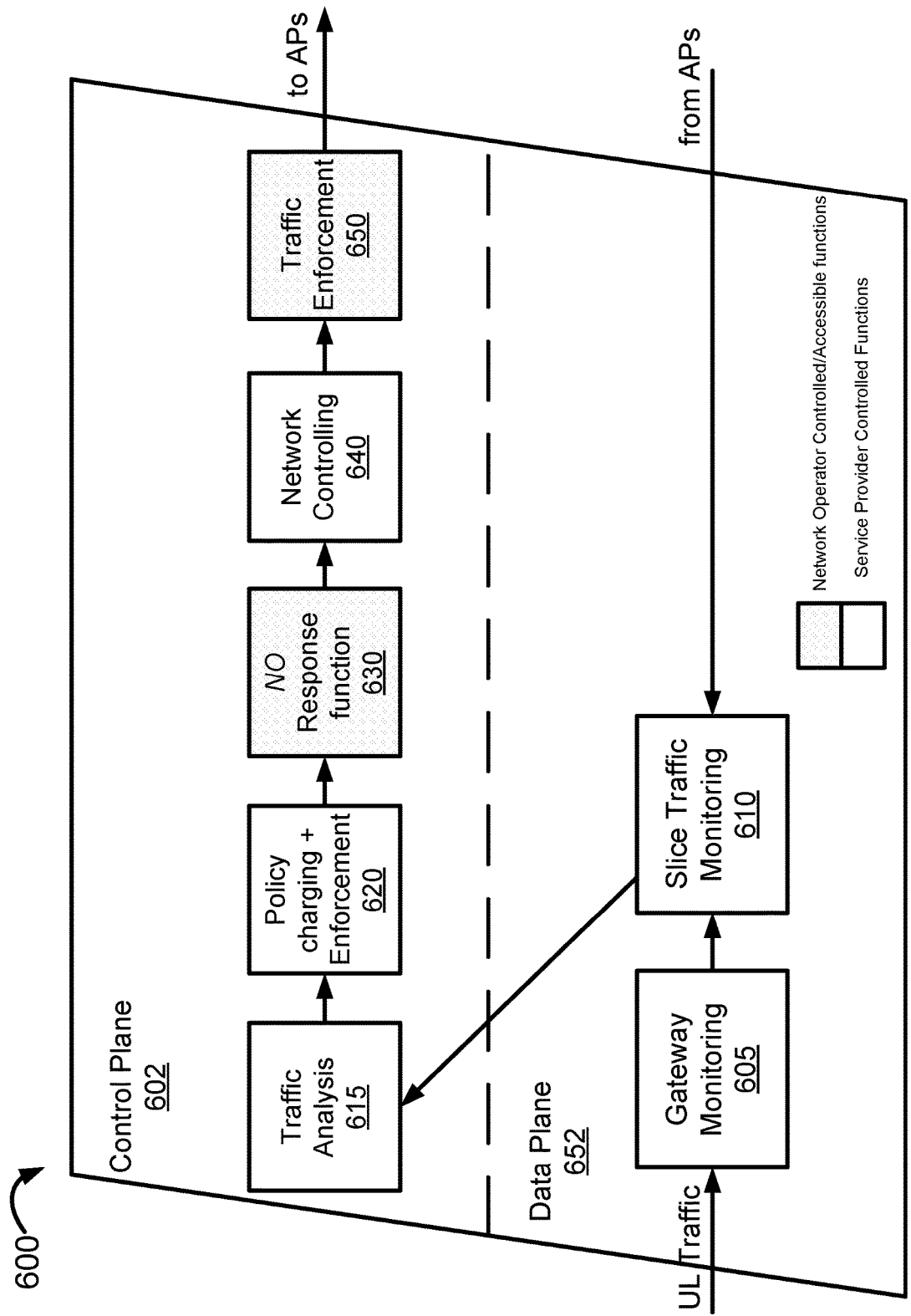
FIG. 6 illustrates another functional representation of a Network Slice, according to an embodiment of the present invention.

Referring to FIG. 6, there is shown a functional representation of a Slice 600 used to manage UpLink (UL) traffic, which for example may comprise any one of Slices 140, 145, and 147, in FIGS. 1-3, in certain embodiments. Slice 600 is similar to that of Slice 500 in FIG.5, except in that the traffic enforcement function 650 is deployed in the Control Plane 602, and is also a NO accessible and controllable function. Provision of a NO accessible/controllable traffic enforcement function 650 in the Control Plane 602 allows the NO to have Traffic enforcement to be carried out in the control plane instead of in the data plane. By shifting Traffic enforcement function 650 from the data plane, the structure of the data plane 652 is further simplified. Decisions about UL traffic flows can be made, much as they were in the DL example of FIG. 5. When Slice Traffic monitoring function 610 receives an indication of an increased UL traffic demand (based on input from at least one of gateway monitoring 605 function or from APs), it can provide this data to Traffic Analysis function 615. The same considerations provided above with respect to the functional elements of slice 500 can be carried out. Traffic Enforcement function 650 can then transmit instructions to APs to reject connections/links associated with a set of selected devices to allow for a reduction in UL traffic. The devices, which may have non-time sensitive traffic flows, would be able to transmit their data at a later point in time.

Figure 7:
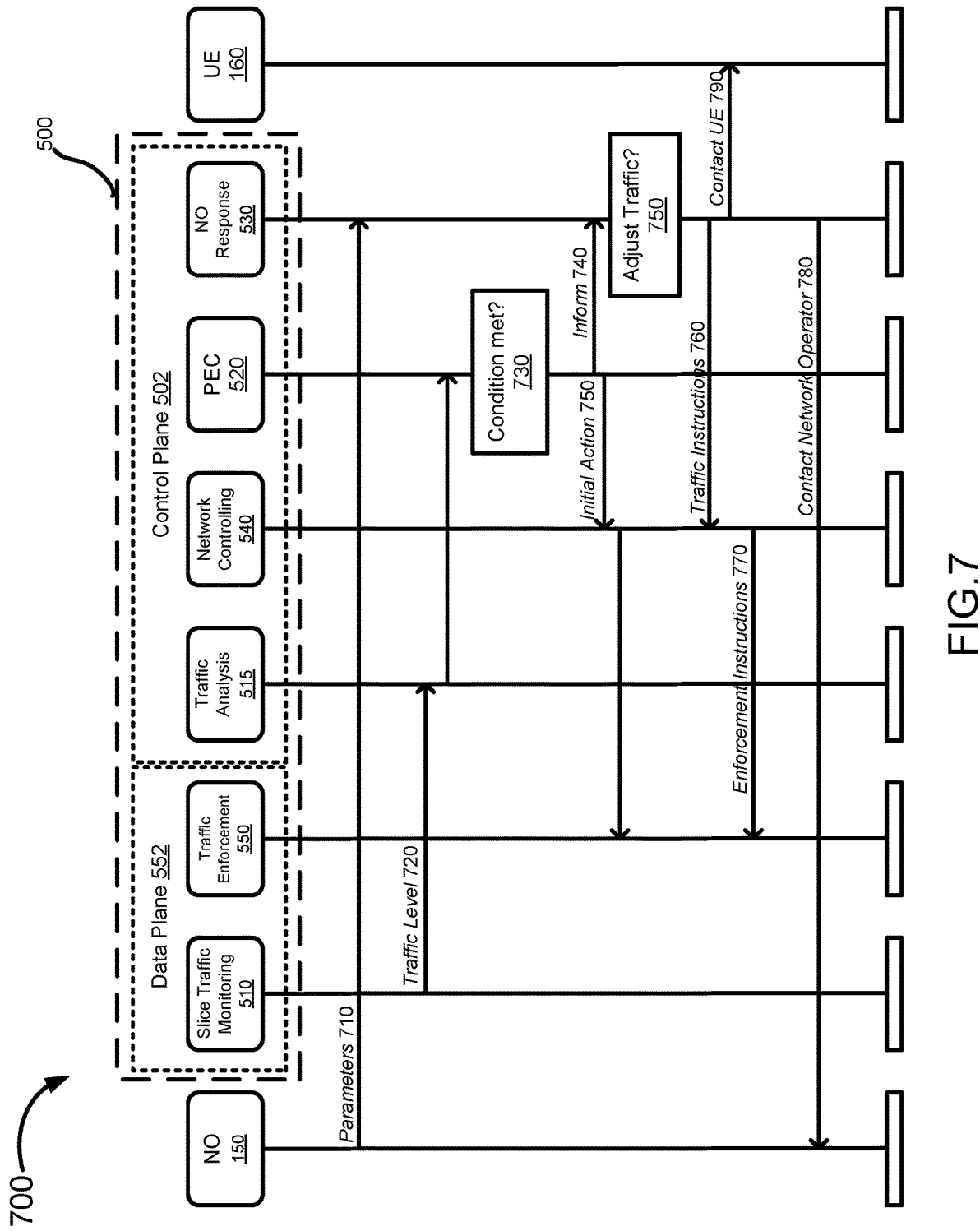
FIG. 7 is a call flow diagram illustrating a method for managing Network Slice enabled traffic, according to an embodiment of the present invention.

Referring to FIG. 7, there is shown a call flow diagram 700 illustrating a method for NO 150 to manage DL traffic enabled by Slice 500 for UE 160 on physical Network infrastructure 110, according to an embodiment. At step 710, NO 150 (or an entity in the OSS/BSS portion of NO 150) provides traffic management parameters to NO response function 530 in the Control Plane 502 of Slice 500. The traffic management parameters may for example, include various thresholds and outline actions that the NO response function 530 may take under certain conditions. At step 720, a traffic level indicative of the traffic enabled by Slice 500 is measured by Slice traffic monitoring function 510 and provided to the traffic analysis function 515, which may process the traffic level and forward to the PEC function 520. At step 730, the PEC function 520 determines whether a condition (e.g. exceeding a threshold) is met. For example, the condition may be whether the traffic level meets or exceeds a threshold of connectivity resources allocated to Slice 500. If the condition is met, PEC 520 may at step 740 inform the NO response function 530 to provide the option of controlling the traffic generated by its devices. The NO response function 530 at step 750 may then determine whether the traffic generated by NO 150's associated devices need to be adjusted to adhere to the condition (for example, to stay within bandwidth limitations set out by a SLA). At Step 760, the NO response function 530 provides traffic instructions to the network controlling function 540 to carry out any adjustments to the traffic. Network controlling function 540 may in turn provide enforcement instructions at step 770 to traffic enforcement function 550. The NO response function 530 may also at step 780, contact NO 150 to inform of its actions (or to request the NO 150 acquire more connectivity resources). In certain embodiments, traffic enforcement function 550 may at step 790, alternatively or additionally, inform or contact UE 160 in order to control, or request that it limit the traffic it generates via Slice 500. Those skilled in the art will appreciate that where discussion of traffic meeting or exceeding a threshold serves as the trigger for actions, it is often possible to meet the same goal by changing the trigger to another condition such as traffic flows falling below a different threshold.

In certain embodiments, NO 150 may additionally re-negotiate resource allocation and/or the SLA with SP 130 (not shown) in view of the information received from NO response function 530. For example, NO 150 may negotiate for additional resources in view of NO response function 530 needing to control the traffic of associated devices. Alternatively, NO 150 may also re-negotiate reducing its allocated resources, or offer its surplus resources to other NOs (not shown) if it is determined that there are surplus resources available after serving its devices.

Figure 8:
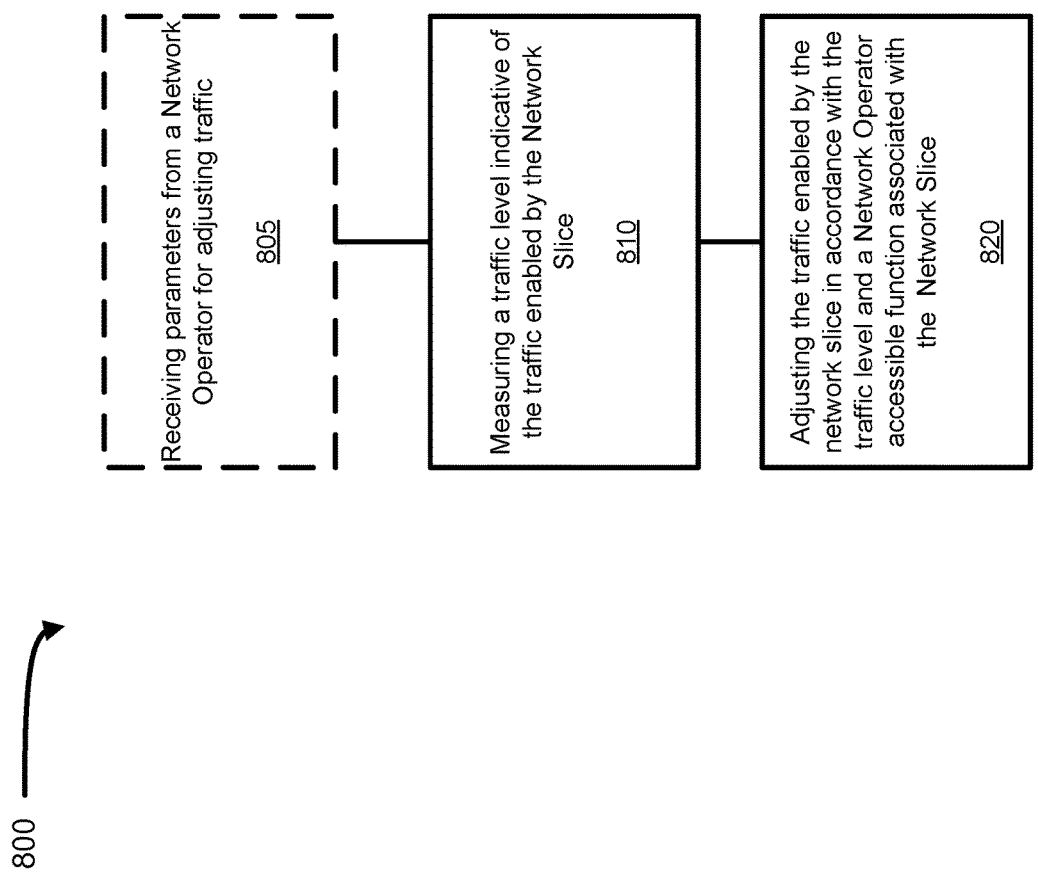
FIG. 8 is a flow chart illustrating a method for managing Network Slice enabled traffic according to an embodiment of the present invention.

Referring to FIG. 8, there is shown a flow chart illustrating a method 800 for managing network slice enabled traffic on a communications network, according to an embodiment. The network slice may be instantiated on the communications network in order to provide connectivity resources to a network operator which has devices communicatively coupled to the communications network. Method 800 may be carried out by any of Slices 140, 145, 147, 400, 500, and 600, on communications network infrastructure 110, for example. At step 810, a traffic level that indicates the traffic enabled by the network slice is measured. At step 820, the traffic enabled by the network slice is then adjusted according to the measured traffic level and a network operator accessible function (for example, NO response function 430, 530, 630).

In certain embodiments, parameters may be received from a NO for adjusting the traffic enabled by the network slice in accordance with the traffic level (step 805), and the network operator accessible function may operate to adjust the traffic controlled/enabled by the network slice in accordance with the parameters.

In certain embodiments, the traffic level (in step 810) may be compared to a threshold, and when the traffic level meets the threshold, the step of adjusting the traffic (step 820) comprises reducing the traffic enabled by the network slice. The threshold may comprise a proportion of connectivity resources of the communications network allocated to the network slice, such that the network slice does not exceed this allotment.

In certain embodiments, the step of adjusting the traffic enabled by the network slice (step 820) may comprise a number of different formats. For example, the network slice enabled traffic may comprise a plurality of flows, and adjustment of traffic may involve prioritizing each flow of the plurality of flows and executing each flow according to the prioritization. In some cases, adjusting the traffic may simply involve blocking at least one of the plurality of flows. When the traffic is generated by a UE on the physical network Infrastructure and associated to the NO, adjustment of the traffic may involve simply informing the UE to reduce its traffic generated on the Network, to access the Network at a later time, or to move to another geographical area not served by the network slice.

In certain embodiments, method 800 can further include steps to re-negotiate with a SP or network Infrastructure owner to obtain additional connectivity resources to meet its traffic demand. For example, the Network Slice can compare the traffic level (from step 810) with a resource allocation threshold (provided by the NO, for example), and when the traffic level meets the resource allocation threshold, it may try acquire additional connectivity resources from a SP or Network. The resource allocation threshold may comprise a proportion of connectivity resources of the communications network allocated to the network slice. In this way, when the traffic enabled by the Network slice approaches its allotment, it can then obtain further connectivity resources in order to prevent over-usage fees as stipulated in a SLA.

In certain embodiments, a similar method (not shown) to method 800 above may be carried out by a NO external to the physical Network infrastructure 110 through a network slice which enables traffic for NO's devices on the Network 110. In this case, the NO may receive a traffic level indicative of the traffic enabled by the network slice, from which the NO may instruct the network slice to adjust the traffic according to the traffic level. In this way, the NO can manage the traffic generated by its devices over the Network 110, to control any fees or usage of the traffic. The network slice need not specifically have a network operator accessible function (for example, network response function 430) in this case as the NO directly determines control over the traffic of its devices. However, if the Network slice has an associated a network operator accessible function, the method may instead comprise providing parameters to the network operator accessible function, which instruct the network operator accessible function how to manage the network slice enabled traffic according to the measured traffic level of the slice. The parameters may then be used by the network operator accessible function to carry out any traffic adjustment in view of the measured traffic level.

Figure 9:
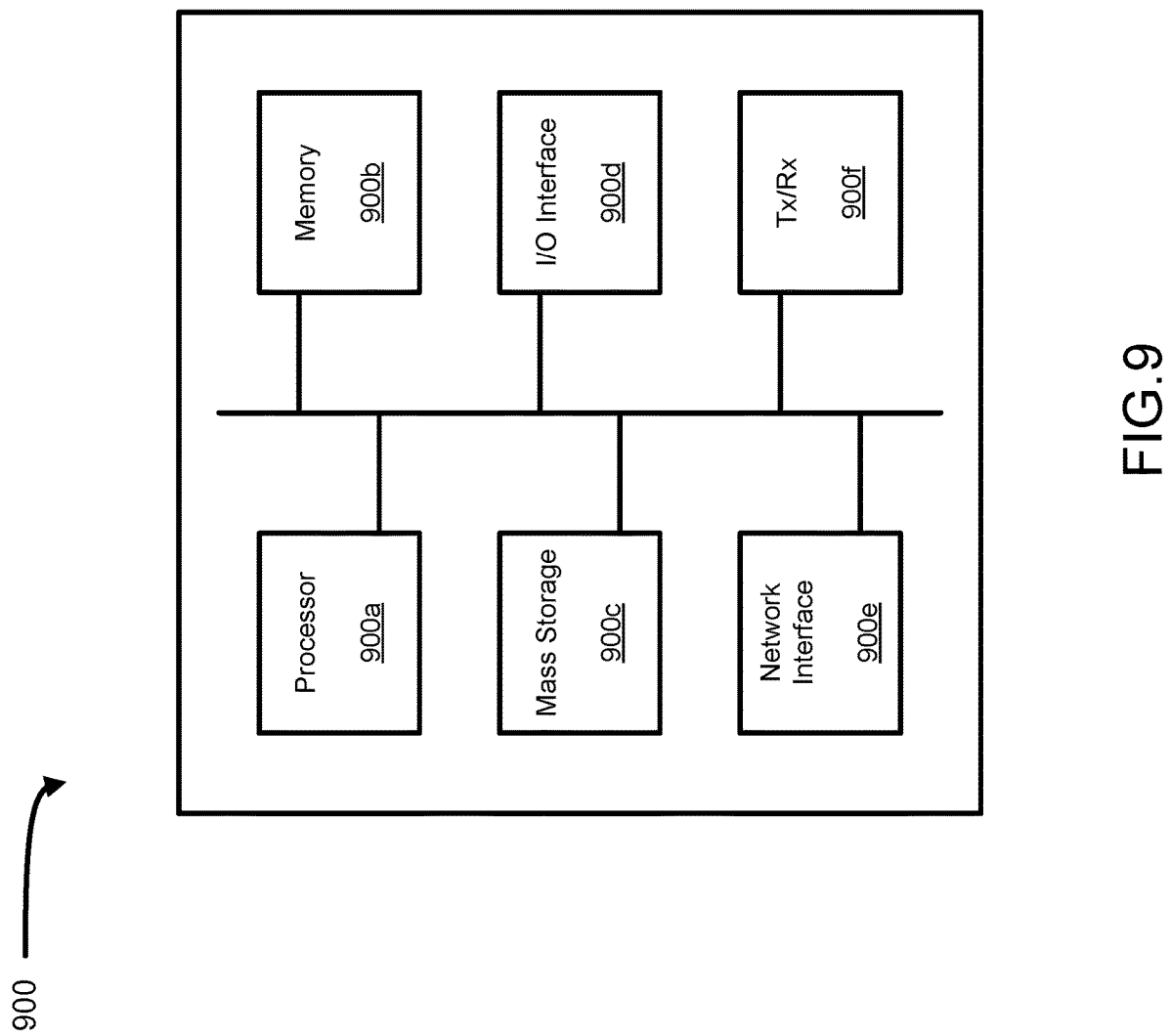
FIG. 9 is a schematic diagram of a network controller according to an embodiment of the present invention.

Referring to FIG. 9, there is shown a schematic diagram of a Network Controller 900 that may for example, perform any or all of steps of method 800 in FIG. 8 and features described herein, according to different embodiments of the present invention. In certain embodiments, NO 150, SP 130, Slices 140, 145, 147, 400, 500, 600, or any Slice function therein, may be independently deployed on Controller 900, for example.

As shown in FIG. 9, the Network Controller 900 includes a processor 900a, memory 900b, non-transitory mass storage 900c, I/O interface 900d, network interface 900e, and a transceiver 900f, all of which are communicatively coupled via bi-directional bus. According to certain embodiments, any or all of the depicted elements may be utilized, or only a subset of the elements. Further, controller 900 may contain multiple instances of certain elements, such as multiple processors, memories, or transceivers. Also, elements of the hardware device may be directly coupled to other elements without the bi-directional bus.

The memory 900b may include any type of non-transitory memory such as static random access memory (SRAM), dynamic random access memory (DRAM), synchronous DRAM (SDRAM), read-only memory (ROM), any combination of such, or the like. The mass storage element 900c may include any type of non-transitory storage device, such as a solid state drive, hard disk drive, a magnetic disk drive, an optical disk drive, USB drive, or any computer program product configured to store data and machine executable program code. According to certain embodiments, the memory 900b or mass storage 900c may have recorded thereon statements and instructions executable by the processor 900a for performing any of the aforementioned method steps described above.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for assuring Service Level Agreement (SLA) compliance in a network slice, the method comprising:
    receiving a traffic level analysis indicative that traffic carried within the network slice meets a condition, the traffic including a plurality of flows;
    determining that the received traffic level analysis is indicative of an unwanted traffic profile; and
    transmitting an instruction to a traffic controlling function associated with the network slice, the instruction comprising a modified traffic management parameter that prioritizes at least one of the plurality of flows to adjust the unwanted traffic profile within the network slice.

2. The method of claim 1 further comprising receiving a traffic management parameter from a network operator.

3. The method of claim 2 wherein the traffic management parameter comprises a threshold and actions that are taken under the unwanted traffic profile.

4. The method of claim 1 further comprising examining an SLA to define the unwanted traffic profile, the SLA being associated with the network slice and established between a service provider and a network operator.

5. The method of claim 4 wherein the network operator is an administrative entity which is different from the service provider.

6. The method of claim 1 further comprising requesting that a network operator modify an SLA to change a quantity of resources or a traffic demand included in the SLA as assigned for the network slice.

7. The method of claim 1 wherein the traffic level analysis comprises an indication of charges to be incurred by a network operator, the modified traffic management parameter in response to the charges.

8. The method of claim 1 further comprising determining a policy that defines the unwanted traffic profile.

9. The method of claim 8 wherein the unwanted traffic profile comprises a resource usage parameter or a threshold of traffic, wherein the resource usage parameter is generated by the network slice.

10. The method of claim 1 wherein the adjustment of the unwanted traffic profile comprises blocking the at least one of the plurality of flows.

11. A network function for managing traffic on a communications network corresponding to a user equipment associated with a network operator, the network function comprising:
   a processor;
   an input interface for receiving an indication of an unwanted traffic profile indicative of the traffic corresponding to the user equipment, and parameters from the network operator for adjusting the traffic on the communications network in accordance with a traffic level, wherein the traffic corresponding to the user equipment comprises a plurality of flows;
   an output interface for transmitting messages to a network function; and
   a non-transient memory storing instructions processor-executable code that when executed by the processor causes the network function to transmit, over the output interface, an instruction to a traffic enforcement function to modify traffic management parameters to adjust a traffic profile within a network slice in accordance with the indication, the instruction further including a modified traffic management parameter to prioritize at least one of the plurality of flows.

12. The network function of claim 11 wherein the indication comprises instructions processor-executable code to cause the network function to receive a second indication indicating that the traffic has been compared to a threshold, that the traffic met the threshold, and that a second instruction had been transmitted to the user equipment to reduce the traffic corresponding to the user equipment.

13. A system for managing traffic on a communications network corresponding to a user equipment associated with a network operator, the system comprising: at least one processor and at least one machine readable medium storing executable instructions which when executed by the at least one processor implements:
   a slice traffic monitoring function configured for monitoring the traffic within a network slice to produce a traffic level measurement, the traffic including a plurality of flows;
   a traffic analysis module configured for receiving the traffic level measurement and determining a change in a traffic level associated with a plurality of devices within the network slice;
   a network operator response function configured for receiving an indication and determining an instruction in response to the change in the traffic level, the instruction including a modified traffic management parameter that prioritizes at least one of the plurality of flows; and
   a network controller configured for receiving the instruction to adjust an unwanted traffic profile within the network slice.

14. The system in claim 13, wherein the executable instructions which when executed by the at least one processor further implements: a policy enforcement and charging function configured for receiving the change in the traffic level and determining if the change in the traffic level is indicative of the unwanted traffic profile and providing the indication to the network operator response function.

15. The system of claim 13 wherein the network operator response function is further configured to receives a traffic management parameter from the network operator, the traffic management parameter comprising a threshold and an action that the network operator response function will take based on the indication.

16. The system of claim 15 wherein the threshold is related to fees charged to the network operator for use of the network slice.

17. The system of claim 13 wherein the instruction instructs blocking of at least one of the plurality of flows.

18. The system of claim 13 wherein the instruction instructs at least one of the plurality of devices to reduce the traffic carried within the network slice.

19. The system of claim 13 wherein the instruction instructs acquisition of additional connectivity resources for the network slice from the communications network.

20. The system of claim 13 wherein the network operator response function is controlled by the network operator to provision traffic associated with the user equipment operating via the network slice.

\* \* \* \* \*